United States Patent [19]

Kessler

[11] 4,061,702
[45] Dec. 6, 1977

[54] METHOD OF MAKING A PLASTIC CONTAINER

[76] Inventor: Milton Kessler, 6690 Harrington Ave., Youngstown, Ohio 44512

[21] Appl. No.: 726,587

[22] Filed: Sept. 27, 1976

Related U.S. Application Data

[63] Continuation-in-part of Ser. No. 552,111, Feb. 24, 1975, abandoned.

[51] Int. Cl.² ............................................. B29D 23/20
[52] U.S. Cl. ......................................... 264/24; 53/29; 156/150; 264/154; 264/296; 264/303; 264/325
[58] Field of Search ................. 264/154, 303, 325, 24, 264/296, 309, DIG. 41, DIG. 51, DIG. 72; 53/29

[56] References Cited

U.S. PATENT DOCUMENTS

| | | | |
|---|---|---|---|
| 1,727,281 | 9/1929 | Fulton | 264/DIG. 41 |
| 2,418,155 | 4/1947 | Bogoslowsky | 264/296 |
| 2,786,238 | 3/1957 | Shapero | 264/303 |
| 2,983,959 | 5/1961 | Shapero | 264/303 X |
| 3,032,454 | 5/1962 | Rohdin | 264/320 X |
| 3,187,381 | 6/1965 | Britten | 264/24 X |
| 3,226,464 | 12/1965 | Saumsiegle | 264/325 |
| 3,491,170 | 1/1970 | Roe | 264/24 |

*Primary Examiner*—Richard R. Kucia
*Attorney, Agent, or Firm*—Meyer, Tilberry & Body

[57] ABSTRACT

The method of coating a form such as a core or mold to make a thin walled thermoplastic container shell wherein excess plastic is provided in the wall of the shell where required in a predetermined material increasing configuration. The excess plastic is then molded under heat and pressure to provide a localized thickened wall portion of the container.

25 Claims, 25 Drawing Figures

METHOD OF MAKING A PLASTIC CONTAINER

BACKGROUND OF THE INVENTION

This is a continuation-in-part of patent application Ser. No. 552,111, filed Feb. 24, 1975 now abandoned.

Plastic collapsible containers, and in particular squeeze tubes such as are used for toothpaste, gel-type detergents, shampoos, and the like, are made by the hundreds of millions, and constitute an appreciable part of the price of the product. These tubes typically are in the form of a thin walled plastic shell sealed at one end and with dispensing means formed at the opposite end. The dispensing means end usually consists of a conical portion tapering to a nozzle adapted to receive a closure cap of either the screw-on or snap-on variety. In order to form threads for a screw-on cap, or a thickened ring for a snap-on cap, with sufficient strength to retain the cap and to sustain opening and closing torques, the nozzle wall must be made much thicker than the wall of the body portion of the tube.

Thin walled containers with selected thickened portions have been made heretofore by several processes or by a combination of processes such as extruding, blow molding, cementing, spin-welding, ultra-sonic welding, and the like. For instance, in the extruding art, the R. W. Saumsiegle et al U.S. Pat. No. 3,226,464 starts with a piece of extruded thermoplastic tubing in excess of the final length of the finished product. Die means crush the excess to crudely approximate the conical portion of the product, whereinafter the crushing die is removed and replaced by a heated forming die to mold the thermoplastic crushed portion into a final configuration. Neither the starting raw tube nor the method of forming this tube is related to, or contributes to, the plastic coating art. The disclosures of Bogoslowsky U.S. Pat. No. 2,418,155 and Rohdin U.S. Pat. No. 3,032,454 also show methods of forming plastic sheets into tubes but without regard for the formation of the sheets per se, or the problem of increased wall thickness in specific critical areas. In the electrostatic spray forming art applicant is aware of devices and methods for spray forming bottles, such as disclosed in the patents to Britten U.S. Pat. No. 3,187,381 and to Roe U.S. Pat. No. 3,491,170. However, neither of these devices or methods recognizes the problems of plastic coating so as to enable a product to be formed with varying wall thicknesses. Nor is applicant aware of any other electrostatic spray method or apparatus which recognizes, let alone solves, the problems attendant with manufacturing a plastic container with non-uniform wall thicknesses.

Generally, the commercially available techniques, all well known to those skilled in the art, for applying a thin coat of plastic in or about a mold or core may be divided into electrostatic and non-electrostatic methods. Electrostatic applications include spraying powder or liquid; dipping into a liquid or a fluidized bed of powder; or dipping into non-fluidized powder. Non-electrostatic applications include the use of heated or unheated liquids which may be applied by various means such as spraying or dipping. Although the invention contemplates the use of all prior art plastic coating and molding techniques, known electrostatic methods of application are presently preferred.

The foregoing plastic coating techniques permit applications of wall thickness up to 0.040 inches maximum, which is insufficient for adequate closure support forming. The problem is, therefore, proportionately magnified with containers having wall thicknesses many times thinner than 0.040 inches. Thus, applicant is aware of no prior art which teaches, renders obvious, or even suggests his invention of forming thin walled containers to provide increased wall thicknesses where required.

It is therefore a general object of this invention to provide a method of thermoplastic coating and molding which will enable the manufacture of ultra-thin walled containers with localized thickened areas.

It is a specific object of this invention to provide a method of thermoplastic coating and molding which will enable the manufacture of ultra-thin walled containers with thickened closure receiving nozzles.

It is another specific object of this invention to provide a method of thermoplastic coating and molding which will enable the manufacture of ultra-thin walled containers having wall portions longitudinally and/or circumferentially reinforced.

It is another object of this invention to provide a method of thermoplastic coating which will enable the manufacture of thermoplastic containers wherein localized areas may be thickened in excess of the coating thickness capacity of present coating methods and apparatus.

It is yet another object of this invention to provide a method of thermoplastic coating and molding thermoplastic containers which is competitive with other methods of forming thermoplastic containers.

It is still another object of this invention to provide a method of thermoplastic coating and molding thermoplastic containers which is inexpensive and suitable for manufacture with high production techniques.

It is a further object of this invention to provide a method of thermoplastic coating and molding which is useful in the manufacture of ultra-thin thermoplastic containers having sidewalls in the order of 0.008 inches or less.

With the foregoing and other objects and features of the invention which will become evident from a reading of the specification in conjunction with and as shown in the accompanying drawings, the invention consists of certain novel features of design, arrangement and method of manufacturing as particularly pointed out in the appended claims, it being understood that various changes in the form, proportion, size and minor details of the invention may be made without departing from the spirit, or sacrificing any of the advantages, of the invention.

For the purpose of facilitating an understanding of my invention, I have illustrated in the accompanying drawings preferred embodiments thereof, from an inspection of which, when considered in connection with the following description, my invention, its application and many of its advantages will be readily understood.

Reference is now made to the drawings in which the same characters of reference are employed to indicate corresponding or similar parts throughout the several figures of the drawings in which.

Figure 1:
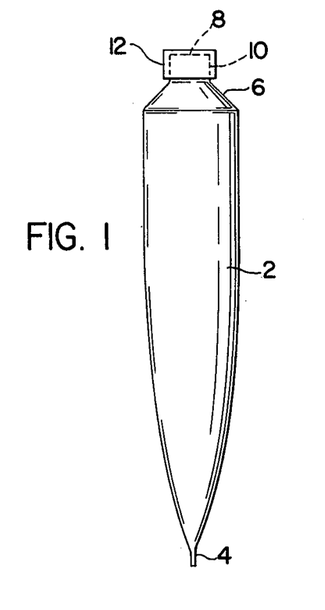
FIG. 1 shows an ordinary plastic squeeze tube with a screw-on cap.
Figure 2:
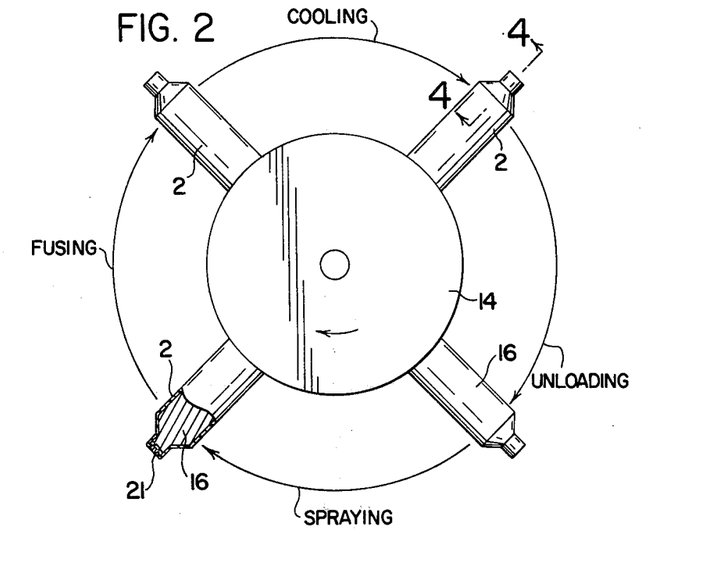
FIG. 2 is an elevational view of a drum exteriorly carrying cores for electrostatic spray forming of squeeze tubes.
Figure 3:
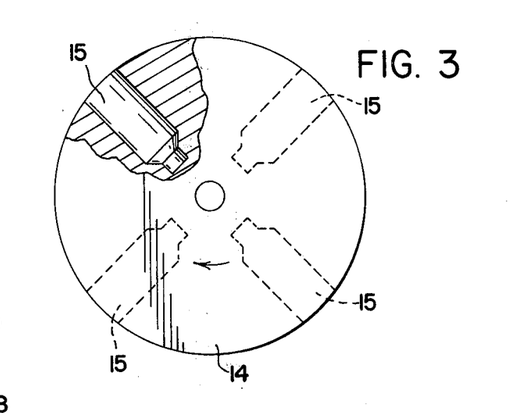
FIG. 3 is an elevational view similar to FIG. 2 showing squeeze tube mold cavities in a drum.

Referring now to the Figures in greater detail, my invention relates to the manufacture of thermoplastic container shells for containers such as illustrated in FIG. 1, comprising a tube 2, with a sealed lower end 4, a conical portion 6, and a closure receiving nozzle 8 with threads 10 to receive a threaded closure 12. I employ the term "shell" to describe a container before the lower end 4 is sealed. Although any method of plastic coating a mold or core known in the prior art may be used, in the practice of my invention, I prefer to utilize a recently developed method of forming thermoplastic articles wherein products may be molded directly from finely divided plastic resin in a single revolution of a drum 14, FIG. 2, equipped with cores 16. As the drum 14 revolves, it passes over an electrostatically charged fluidized bed, not shown, containing powdered resin particles which are electrostatically attracted to the cores 16, i.e. sprayed on the cores. Thereafter, the powder is fused into a homogeneous layer by applying heat to the cores. As the drum continues to revolve, the cores are cooled and finally the container shell is removed by mechanical, air or vacuum operated pick-off means. In the alternative, as shown in FIG. 3, drum 14 may be provided with mold cavities 15, wherein the products are formed interiorly of the drum rather than exteriorly as shown in FIG. 2. Hereinafter, however, the expression "core" will be used throughout in the specification and claims, it being understood that as so used it is intended to include either a male core or a female mold. The molding methods and apparatus illustrated in FIGS. 2 and 3 are old in the art and I make no claim to either. However, I do propose to use some method of electrostatic forming in the practice of my invention, since to my knowledge it is presently preferable to non-electrostatic plastic application. Unfortunately, the maximum wall thickness which is obtainable with any coating process known to me is in the order of 0.040 inches, while the nozzle wall of a collapsible plastic tube must be approximately twice that thickness and in some cases even greater.

Figure 4:
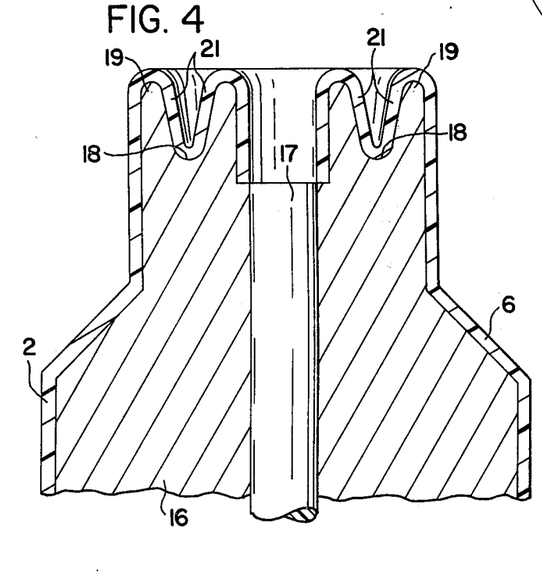
FIG. 4 is a fragmentary sectional view, taken on line 4—4 of FIG. 2 of a core following electrostatic spraying.
Figure 5:
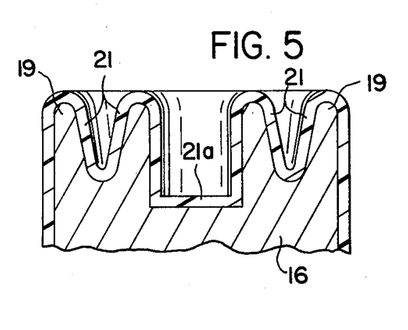
FIG. 5 is a fragmentary sectional view similar to FIG. 4 showing a modified core following electrostatic spraying.
Figure 18:
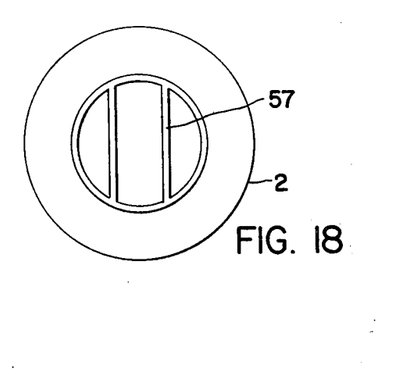
FIG. 18 is a fragmentary top view of a squeeze tube in accordance with the invention prior to final formation of the nozzle showing an alternate form of material increasing extensions for reinforcing the nozzle cap receiving portion.
Figure 19:
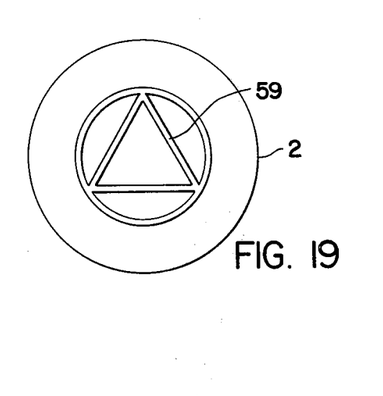
FIGS. 19, 20 and 21 are fragmentary top views of squeeze tubes similar to FIG. 18 showing other geometrical configurations of material increasing extensions for reinforcing the nozzle cap receiving portions of the tubes.
Figure 20:
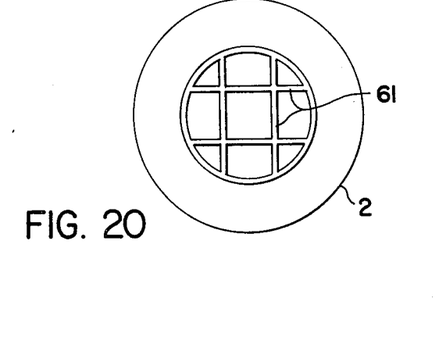
Figure 21:
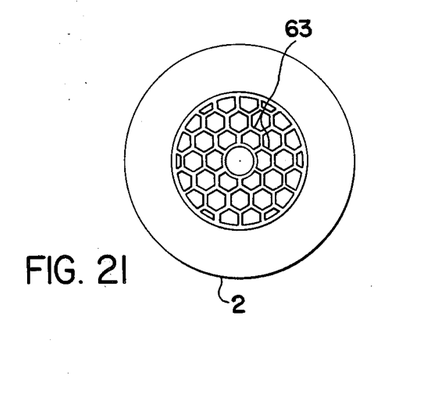

In a preferred embodiment of the present invention, I solve this problem by providing an improved core, one end of which is provided with a plurality of material increasing extensions to which thermoplastic powdered resin will adhere. As shown in FIG. 4, these material increasing extensions are in the form of a series of concentric grooves 18 and ridges 19 over which may be deposited concentric integrally connected pleats 21 of thermoplastic resin. As further shown in FIG. 4, the core 14 may be provided with a plug 17 of Teflon or similar material, to which the thermoplastic particles will not adhere, so as to leave an aperture at the center of the end of the formed tube. However, the plug may be dispensed with in another embodiment, as shown in FIG. 5, thereby permitting a membrane 21a to bridge the periphery of the innermost pleat. This membrane may be pierced in a subsequent die forming operation, or by the end user when shelf life or sterility requires a hermetically sealed container until actual use. Single doseage disposable medicinal capsules are an example of an application of the embodiment of FIG. 5. The pleats 21 are then heated and squeezed together between dies under pressure to form the desired final shape of the nozzle, there being enough pleats so that their combined thickness is sufficient for this purpose. Other configurations for increasing surface area in the vicinity of the nozzle may also be resorted to, such as the corrugations 56 shown in FIGS. 15 and 16; fins 57, FIG. 18; and honeycombs or other similar geometrical patterns 59, 61 and 63 shown for illustrative purposes in FIGS. 19, 20 and 21, respectively.

Since the maximum wall thickness that can presently be obtained by the above described processes is approximately 0.040 inches, with the core embodiment of FIG.

Figure 13:
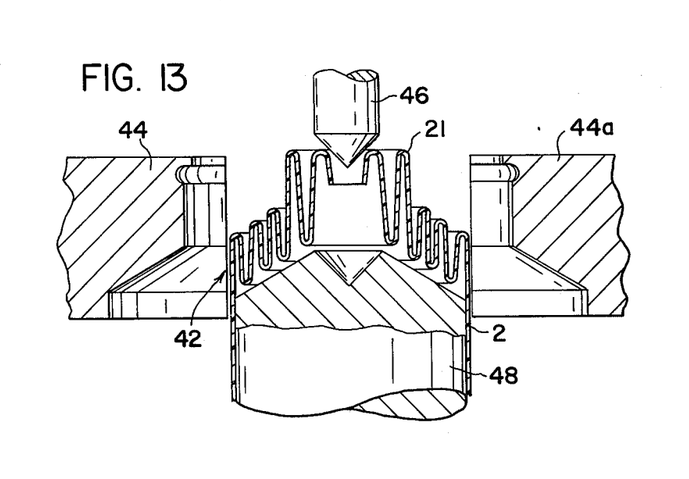
FIGS. 13 and 14 are fragmentary sectional views, similar to FIGS. 9 and 10, respectively, showing the formation of a snap-on type of nozzle on a squeeze tube with a thickened conical section.

4, the nozzle wall thickness is increased four-fold. From the foregoing it is apparent that additional increases in nozzle wall thickness may be obtained by increasing the number of concentric pleats 21, such as shown in FIG. 13.

Figure 6:
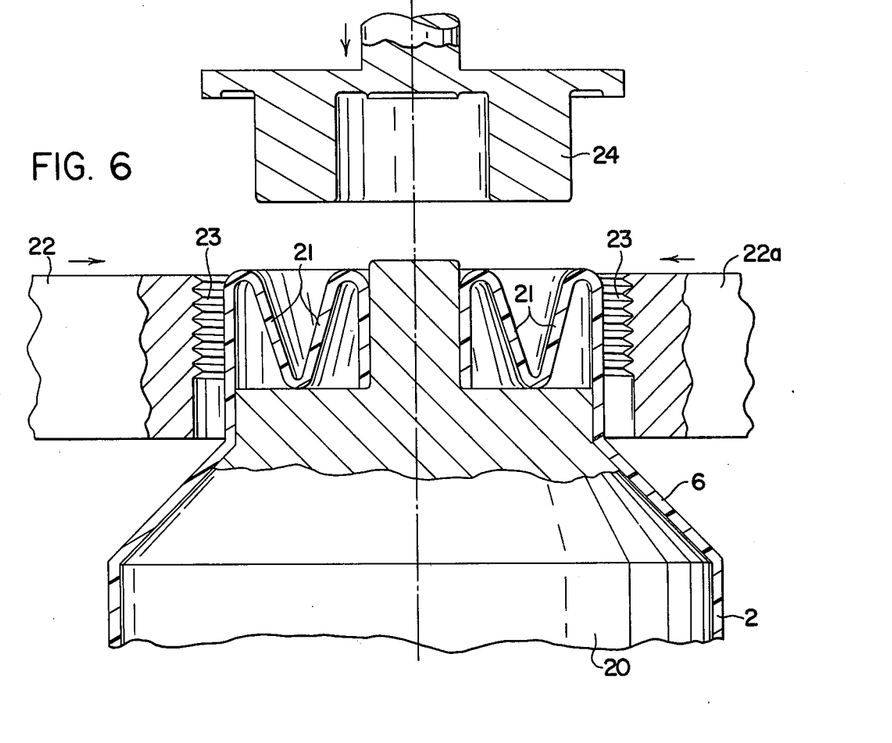
FIG. 6 is a fragmentary sectional view of a mandrel mounted squeeze tube at the start of the thread and nozzle forming operation employing a three piece die set.
Figure 7:
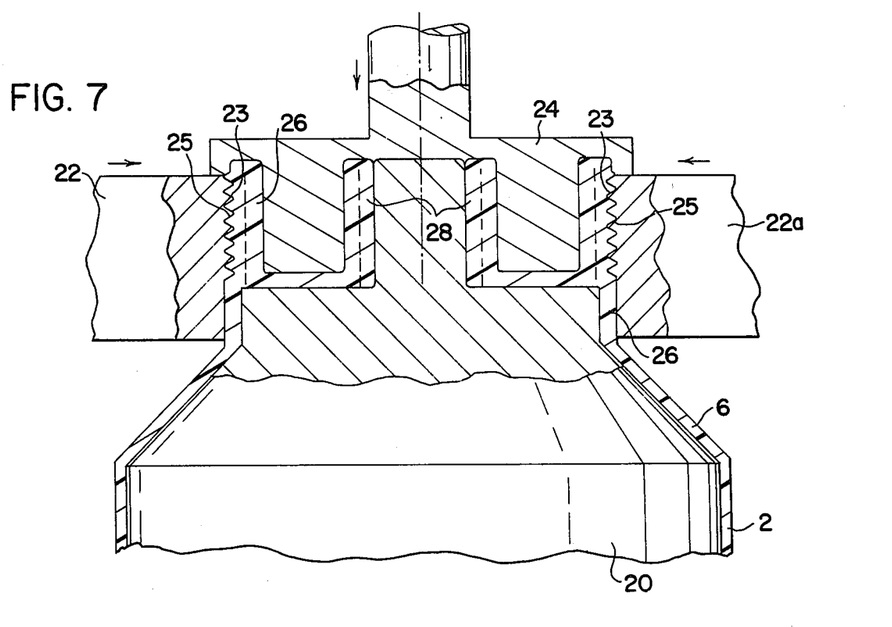
FIG. 7 is a sectional view, similar to FIG. 6, showing the completion of the three piece die thread and nozzle forming operation.

After the product is stripped from the core 16 and thereby discharged from the drum 14, it is deposited on a mandrel 20, as shown in FIG. 6. Mandrel 20 is then heated in any conventional fashion to soften the thermoplastic nozzle pleats 21 to a plastic flow temperature, whereupon the movable die elements 22, 22a and 24 are brought together as shown in FIG. 7, to compress the pleats 21 into a double walled nozzle with an externally screw threaded outer wall 26 and an inner dispensing spout 28. Elements 22 and 22a each have threaded forms 23 for impressing the desired external screw thread 25 on outer wall 26. The number and dimensions of the pleats 21 formed on the core 16 are carefully calculated to completely fill the die space and to form the completed wall portions 26 and 28.

Figure 8:
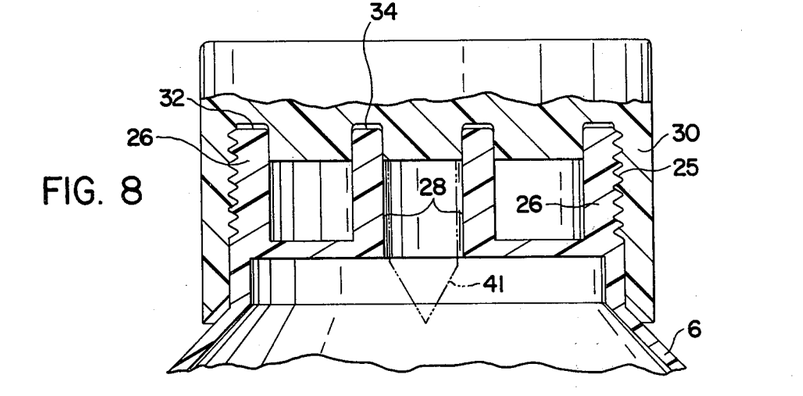
FIG. 8 is a fragmentary sectional view of the dispensing end of the completed squeeze tube with a screw cap in place.
Figure 22:
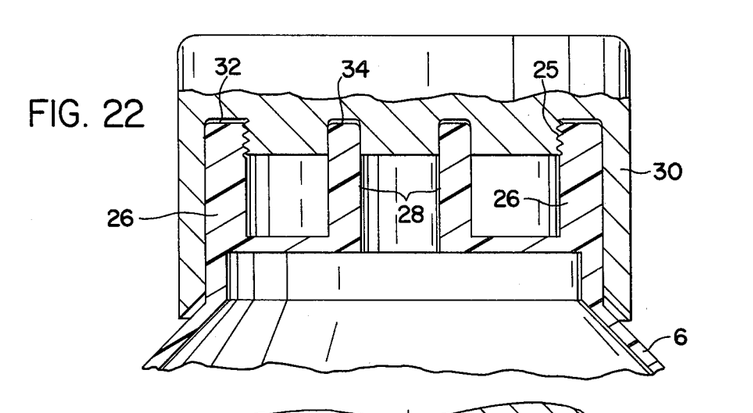
FIG. 22 is a fragmentary sectional view of the dispensing end of a completed squeeze tube, similar to FIG. 8, but internally threaded to receive a screw cap thereon.

The finished product with a cap 30 screwed on the nozzle wall 26 is shown in FIG. 8. The cap is of a relatively large external diameter, as preferred by some users, both for appearance and for better finger grip by the user. This type of cap also permits a multiple seal at rims 32 and 34 of concentric walls 26 and 28. The location of threads 25 is a matter of choice. As shown in FIG. 22 they may be formed on the inside surface of outer wall 26, or on either wall surface of inner wall 28.

Figure 9:
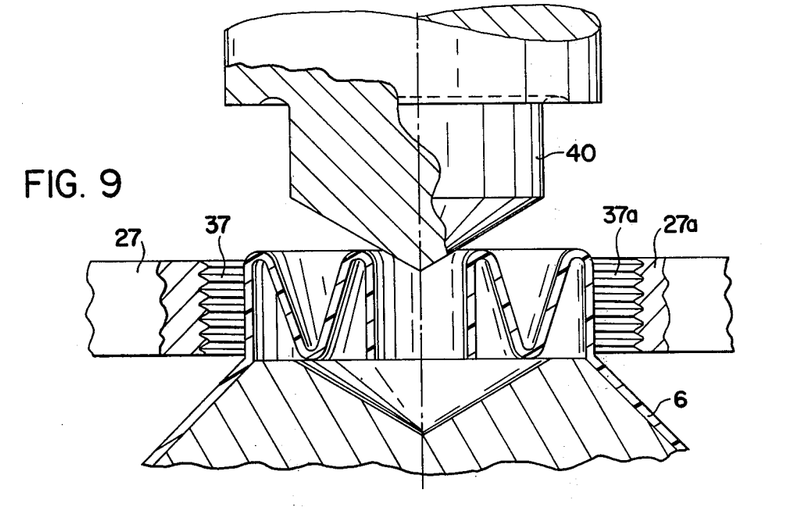
FIGS. 9 and 10 are fragmentary sectional views, similar to FIGS. 6 and 7, respectively, showing the forming of a single wall screw threaded spout, utilizing a three piece die set.
Figure 10:
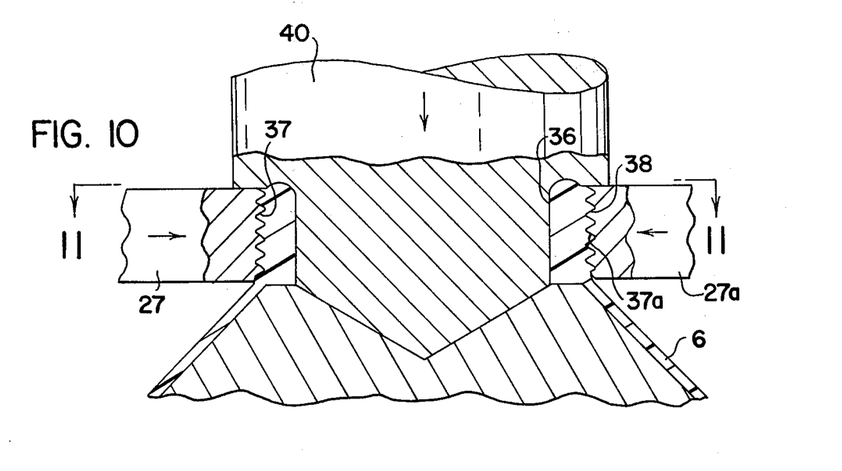
Figure 23:
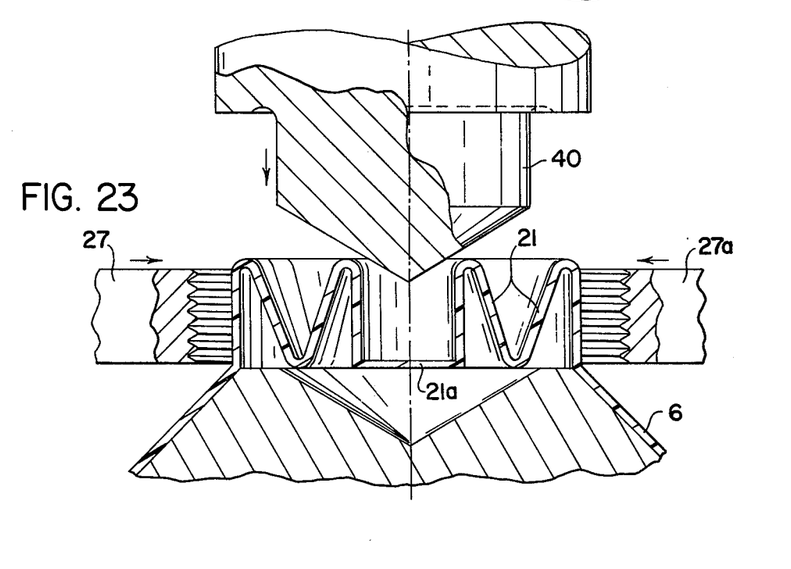
FIG. 23 is a fragmentary sectional view similar to FIG. 9 but with an imperforate tube end suitable for piercing during the nozzle finishing operation or upon first use.

FIGS. 9 and 10 show dies for forming a single walled nozzle 36 provided with an external thread 38, which, as aforesaid, may also be an internal thread on the inner surface of nozzle 36. Upper die 40 may also be used to pierce membrane 21a, as shown in FIG. 23. In the alternative, cap 30, FIG. 8, may be provided with a membrane piercing pin 41.

Figure 11:
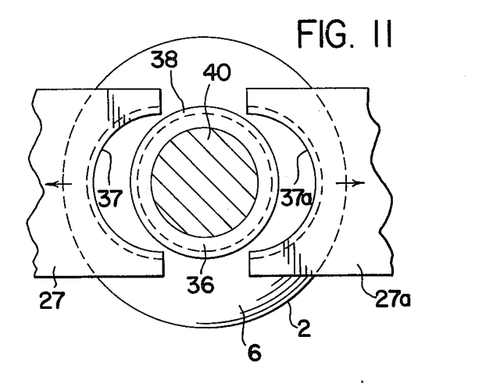
FIG. 11 is a fragmentary sectional view taken on line 11—11 of FIG. 10, but after dies 27 and 27a have started to part.
Figure 12:
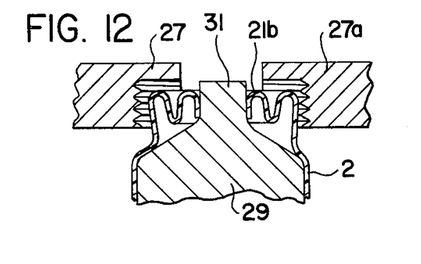
FIG. 12 is a fragmentary view of a two piece die useable for forming engaging means on a tube spout starting with preformed corrugated extensions.

FIG. 11 shows the thread forming portions 37, 37a of the dies 27, 27a, just as they are separating. FIG. 12 illustrates two piece nozzle forming dies 27 and 27a with a mandrel 29 having a nozzle insert portion 31 to back up dies 27 and 27a. In this embodiment, the material increasing extensions 21b may be arrayed for forming square or other irregular shaped nozzles to receive high stype snap-on caps.

Figure 14:
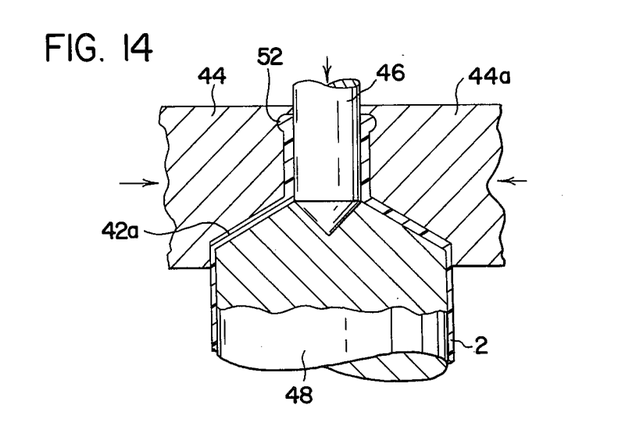

FIG. 13 shows dies to form a tube spout for a snap-on cap. In this embodiment it is also shown how the thickness of the conical section 42a, FIG. 14, may be increased if desired, by forming a multiplicity of pleats 42, FIG. 13, in the vicinity of the conical section of the final product. The dies 44, 44a together with the plunger 46 cooperate with the mandrel 48 to form a thickened conical section 42a and a thickened nozzle and spout 52 for receiving a standard snap-on type cap, not shown.

Figure 15:
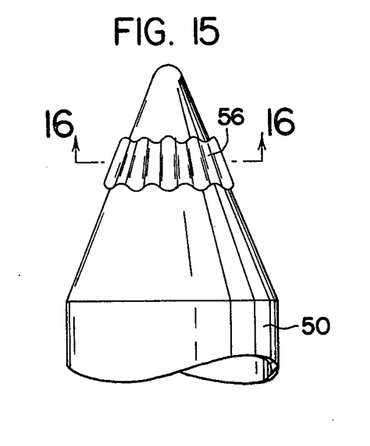
FIG. 15 is a fragmentary view of a snip-top nozzle prior to thread forming.
Figures 16, 17:
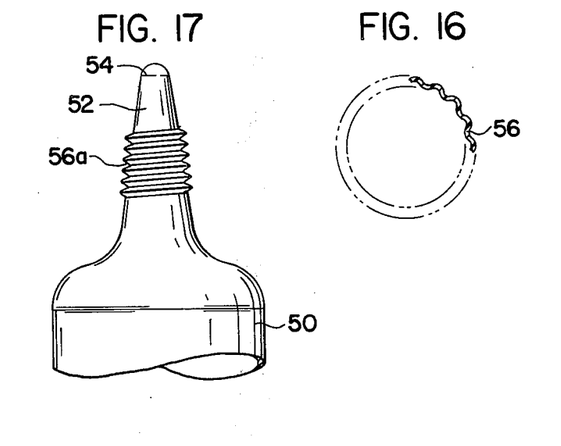
FIG. 16 is a sectional view taken on line 16—16 of FIG. 15.
FIG. 17 is a fragmentary view of a snip-top slim nozzle after threads have been formed on the nozzle.

FIGS. 15 and 16 show corrugations 56 formed on the conical portion of a squeeze tube 50 which is to be formed with a snip-top spout 52, FIG. 17, having a threaded portion 56a for a cap, not shown, covering the spout. When in use, the top is snipped at the line 54. Although the corrugations 56 are shown formed longitudinally they could also be formed concentrically as shown in FIG. 13.

Figure 24:
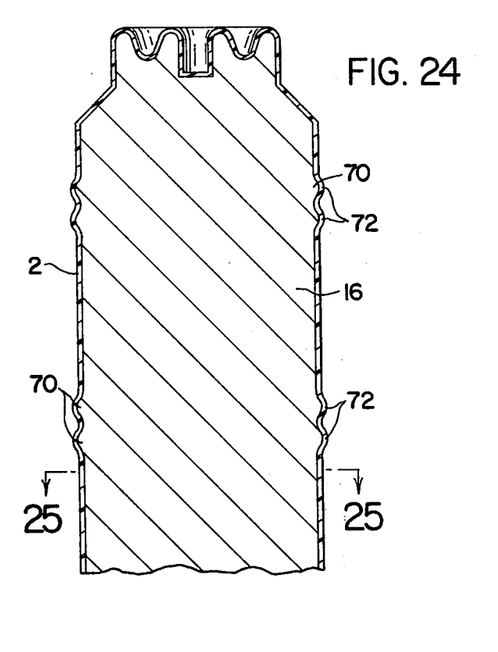
FIG. 24 is a fragmentary longitudinal sectional view of another preferred embodiment of the invention taken along the line 24—24 of FIG. 25, showing means to reinforce other portions of a container by providing thickened wall portions therein; and, FIG. 25 is a transverse sectional view of the embodiment of the invention shown in FIG. 24 taken along the line 25—25 of FIG. 24.

Referring now to FIG. 24, therein is shown in fragmentary longitudinal section a core 16 coated with a thermoplastic to form a container shell 2. About the periphery of the core is provided a plurality of ribs 70 over which are formed an undulating thermoplastic layer of pleats or corrugations 72. By following the method already described with respect to FIGS. 1–23, shell 2 is stripped from the core 16 and placed on a shell support mandrel similar to the mandrel 20 shown in FIG. 6. The corrugations 72 are heated locally to their plastic flow temperature and then compressed with suitable forming die means, similar to die means 44 and 44a shown in FIG. 14, to form circumferential reinforcing ribs in the body of the shell 2.

Figure 25:
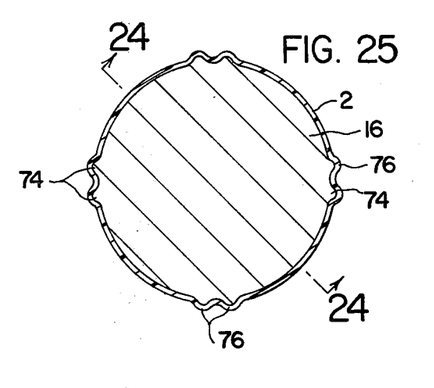

In similar manner, the shell 2 may be strengthened with longitudinal ribs as shown in FIG. 25. Therein shown is a core 16 coated with a thermoplastic to form a container shell 2, the same as shown in FIG. 24. A plurality of ribs 74 extend longitudinally of the core 16 over which are formed an undulating thermoplastic layer of pleats or corrugations 76. The shell 2 is stripped from the core after forming and placed on a shell supporting mandrel whereinafter the corrugations 76 are molded into longitudinal reinforcing ribs in the same manner as the circumferential ribs described with reference to FIG. 24. It is, of course, within the contemplation of my invention that the lengths of the ribs so formed may be varied in length, width, position and angularity relative to the axis of the shell 2.

It is believed that the invention and its advantages will be understood from the foregoing description, and it is further believed that while several preferred embodiments of the invention have been shown and described for illustrative purposes, the structural details are nevertheless capable of variation within the intent and scope of the invention as defined in the appended claims.

Having thus described my invention, I claim:

1. The method of forming a unitary thermoplastic container shell having a thin walled portion and a thicker walled portion comprising the steps of:
   a. forming a core having a plurality of surface increasing extensions thereon;
   b. applying a thermoplastic coating to said core to form a thin walled container shell;
   c. curing said coating;
   d. removing said container shell from said core;
   e. placing said container shell on a shell supporting mandrel;
   f. heating the portion of said container shell formed over said core surface increasing extensions to its plastic flow temperature; and,
   g. compressing the said portion of said container shell formed over said core surface increasing extensions into a thickened wall portion of said container.

2. The method of claim 1, wherein said thickened wall portion is formed into a nozzle.

3. The method of claim 2, wherein closure engaging means are formed on said nozzle.

4. The method of claim 3, wherein said closure engaging means are formed into screw threads.

5. The method of claim 2, wherein said closure engaging means are formed into means to secure a snap-on cap.

6. The method of claim 1, wherein the portion of said container shell formed over said core surface increasing extensions acquires a mating configuration with said core surface increasing extensions.

7. The method of claim 1, wherein the portion of said container shell formed over said core surface increasing extensions provides a plurality of pleats concentric to the longitudinal axis of said container shell.

8. The method of claim 1, wherein the portion of said container shell formed over said core surface increasing extensions provides a plurality of pleats extending transversely to the longitudinal axis of said core.

9. The method of claim 1, wherein the portion of said container shell formed over said core surface increasing extensions provides a plurality of pleats extending parallel to the longitudinal axis of said container shell.

10. The method of claim 1, wherein the portion of said container shell formed over said core surface increasing extensions provides a conical portion.

11. The method of claim 10, wherein said conical portion is formed into pleats.

12. The method of claim 1, wherein the portion of said container shell formed over said core surface increasing extensions provides a plurality of fins.

13. The method of claim 1, wherein the portion of said container shell formed over said core surface increasing extensions provides a geometrical honeycomb.

14. The method of claim 1, wherein the portion of said container shell formed over said core surface increasing extensions provides a polysided configuration.

15. The method of forming a unitary thermoplastic container shell having a thin walled portion and a thick walled portion comprising the steps of:
   a. forming a container core having a plurality of surface increasing extensions in the vicinity of the thick walled portion of said container;
   b. electrostatically applying a thermoplastic coating to said core to form a container shell with material increasing extensions;
   c. removing said shell from said core;
   d. placing said shell on a shell supporting mandrel;
   e. heating said material increasing extensions to their plastic flow temperature; and,
   f. compressing said material increasing extensions into a thickened wall portion of said container.

16. The method of claim 15, wherein said thermoplastic material is comprised of finely divided particulates.

17. The method of claim 15, wherein said thermoplastic material is applied in liquid form.

18. The method of forming a unitary thermoplastic container shell having a thin walled portion and a thick walled portion comprising the steps of:
   a. forming a container core having a plurality of surface increasing extensions in the vicinity of the thick walled portion of said container;
   b. electrostatically applying, fusing and cooling a finely divided thermoplastic coating material to said core to form a container shell with material increasing extensions;
   c. removing said shell from said core;
   d. placing said shell on a shell reinforcing mandrel;
   e. heating said material increasing extensions to their plastic flow temperature; and,
   f. compressing said material increasing extensions into a thickened wall portion of said container shell.

19. The method of forming a unitary thermoplastic container shell having a thin walled tubular body portion and a thicker walled dispensing nozzle portion at one end of said thin walled body portion with closure engaging means formed on said nozzle comprising the steps of:
   a. forming a cylindrical core having a plurality of surface increasing extensions thereon;
   b. electrostatically applying a thermoplastic coating, fusing, and cooling a finely divided thermoplastic material to said core to form a thin walled container shell and an end portion of said container shell;
   c. curing said coating;
   d. removing said container shell from said core;
   e. placing said container shell on a shell supporting mandrel;
   f. heating the portion of said container shell formed over said core surface increasing extensions to its plastic flow temperature; and,
   g. compressing the said portion of said container shell formed over said core surfaces increasing extensions into a nozzle configuration;
   g. forming thereon closure fastening means.

20. The method of claim 19, wherein said core is formed to include means to establish a passage from the interior of said body shell portion through said end portion.

21. The method of claim 19, wherein said end portion is formed imperforate.

22. The method of claim 19, including the step of piercing said tube end shell portion to establish a passage from the interior of said body shell portion through said end portion.

23. The method of claim 19, including the step of sealing the other end of said container shell to form a container.

24. The method of claim 19, including the steps of:
   a. filling said container shell with a dispensable substance; and
   b. sealing the other end of said container shell to package said substance.

25. The method of claim 19, including the steps of:
   a. engaging a closure with said closure fastening means;
   b. filling said container shell with a dispensable substance; and,
   c. sealing the other end of said container shell to package said substance.

* * * * *